(12) United States Patent
Yamashita

(10) Patent No.: US 6,182,717 B1
(45) Date of Patent: Feb. 6, 2001

(54) PROCESS FOR FILLING HYDROGEN INTO A HYDROGEN STORAGE TANK IN AUTOMOBILE

(75) Inventor: Ikuya Yamashita, Wako (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/421,290

(22) Filed: Oct. 20, 1999

(30) Foreign Application Priority Data

Oct. 22, 1998 (JP) .................................................. 10-300459

(51) Int. Cl.⁷ ................................ B65B 1/04; F17C 11/00
(52) U.S. Cl. .................................. 141/82; 141/2; 141/4; 141/18; 141/98; 62/46.2
(58) Field of Search ........................... 141/2, 4, 18, 82, 141/98; 222/146.1; 62/46.2

(56) References Cited

U.S. PATENT DOCUMENTS 4,995,235 * 2/1991 Halene ................................... 62/46.2
5,771,946 * 6/1998 Kooy et al. ............................. 141/82

FOREIGN PATENT DOCUMENTS 7-108909    4/1995  (JP) .

* cited by examiner

Primary Examiner—Henry J. Recla
Assistant Examiner—Peter deVore
(74) Attorney, Agent, or Firm—Arent Fox Kintner Plotkin & Kahn, PLLC

(57) ABSTRACT

In filling hydrogen into a hydrogen storage tank provided in an automobile from a hydrogen station provided with a hydrogen supply tank having a metal hydride with hydrogen absorbed therein, the quantity of heat generated by the metal hydride in the hydrogen storage tank is utilized effectively for the heating of metal hydride in the supply tank, which is required for releasing of the hydrogen in the hydrogen station. Pure water which is a heat transfer medium, is circulated between the hydrogen supply tank and the hydrogen storage tank through water conduits. In the hydrogen storage tank, a metal hydride heated by absorption of hydrogen, is cooled by the pure water, and the pure water raised in temperature by such cooling and is discharged toward the hydrogen supply tank. In the hydrogen supply tank, a metal hydride is heated by the pure water to release hydrogen, and the pure water is lowered in temperature by such heating and is discharged toward the hydrogen storage tank.

1 Claim, 7 Drawing Sheets

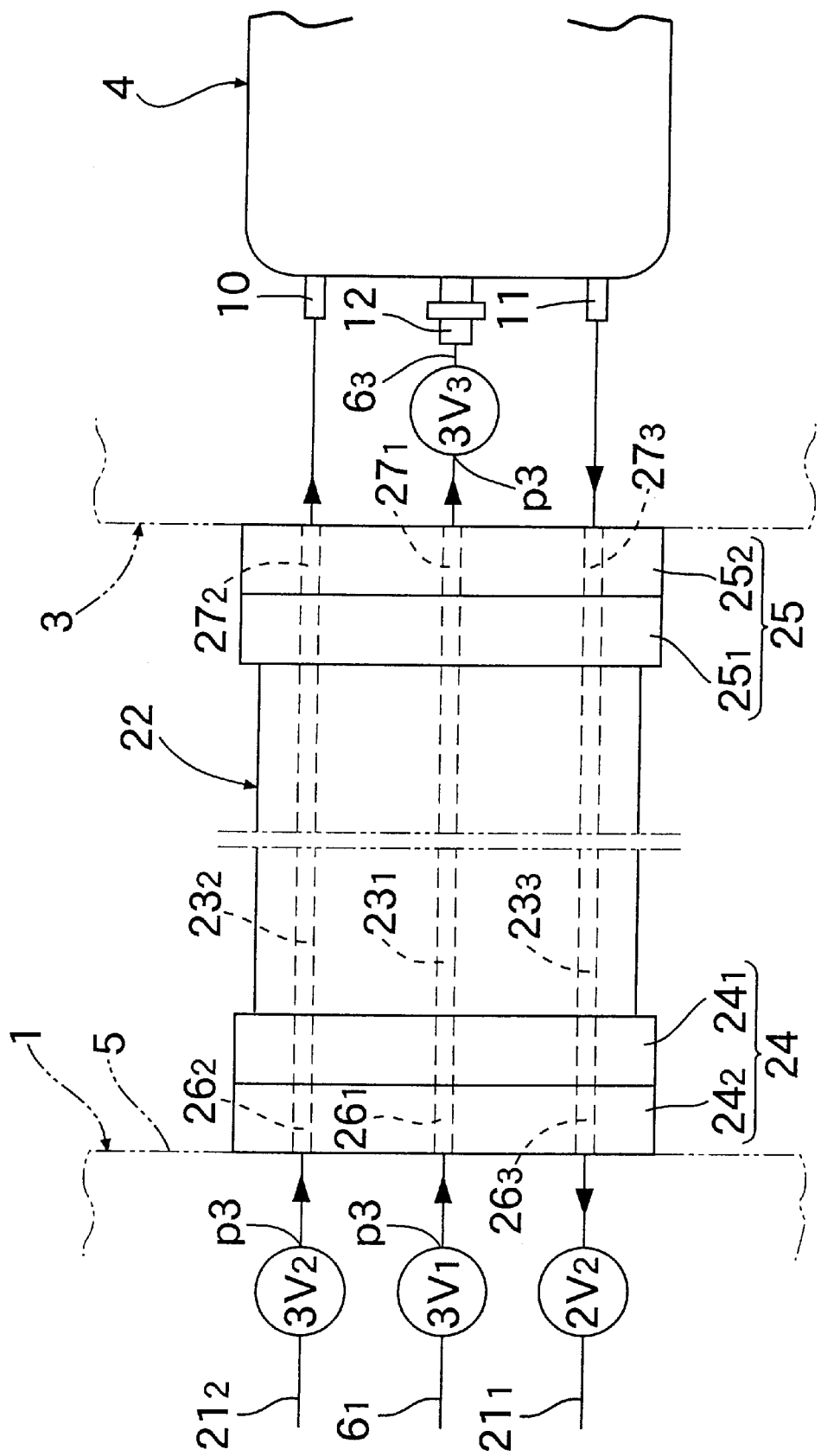

PROCESS FOR FILLING HYDROGEN INTO A HYDROGEN STORAGE TANK IN AUTOMOBILE

BACKGROUND OF THE INVENTION

1. Field of the Invention

The present invention relates to a process for filling hydrogen into a hydrogen storage tank in an automobile having a hydrogen engine or a fuel cell mounted thereon.

2. Description of the Prior Art

When hydrogen is filled into an automobile hydrogen storage tank having a metal hydride in a hydrogen station. The hydrogen station has a hydrogen supply tank having a metal hydride with hydrogen absorbed therein. The metal hydride is heated with exothermic reaction of hydrogen absorption in the hydrogen storage tank. In a prior art process, cooling water is circulated into the hydrogen storage tank to cool the metal hydride, thereby providing an increase in the amount of hydrogen absorbed (for example, see Japanese Patent Application Laid-open No. 7-108909).

With the prior art process, however, the heated metal hydride is merely cooled and for this reason, the effective utilization of the generated quantity of heat is not controlled, which is not preferred for energy saving demand.

SUMMARY OF THE INVENTION

It is an object of the present invention to provide a hydrogen filling process of the above-described type of hydrogen tank, wherein the heat generated by the metal hydride in the hydrogen storage tank in the automobile can be effectively utilized in the hydrogen station for the heating of the metal hydride which is required to release hydrogen, thereby meeting the energy saving demand.

To achieve the above object, according to the present invention, there is provided a process for filling hydrogen into a hydrogen storage tank in an automobile, the hydrogen storage tank having a metal hydride. The hydrogen is supplied from a hydrogen station provided with a hydrogen supply tank having a metal hydride with hydrogen absorbed therein. The process comprises the steps of circulating a heat transfer medium between the hydrogen supply tank and the hydrogen storage tank. In the hydrogen storage tank, the metal hydride which is heated by exothermic reaction of hydrogen absorption, is cooled by the heat transfer medium. The heat transfer medium which has been raised in temperature by such cooling is then discharged into the hydrogen supply tank. In the hydrogen supply tank, the metal hydride is heated by the heat transfer medium to release hydrogen, and the heat transfer medium which is lowered in temperature by an exothermic reaction of the metal hydride, then flows toward the hydrogen storage tank.

If a technique as described above is employed, a predetermined heating source may be used to heat the metal hydride to release hydrogen only at the start of the filling in the hydrogen station. In the subsequent steady state, the quantity of heat generated by the heating of the metal hydride in the hydrogen storage tank can be utilized effectively to release hydrogen in the hydrogen station. On the other hand, the heat transfer medium which is lowered in temperature by the heat exchange in the hydrogen supply tank, is used for cooling of the metal hydride in the hydrogen storage tank and hence, any special cooling means for the heat transfer medium is not required.

BRIEF DESCRIPTION OF THE DRAWINGS

FIG. 7 is an illustration for explaining connected states of various portions in FIG. 5.

DETAILED DESCRIPTION OF THE PREFERRED EMBODIMENTS

Figure 1:
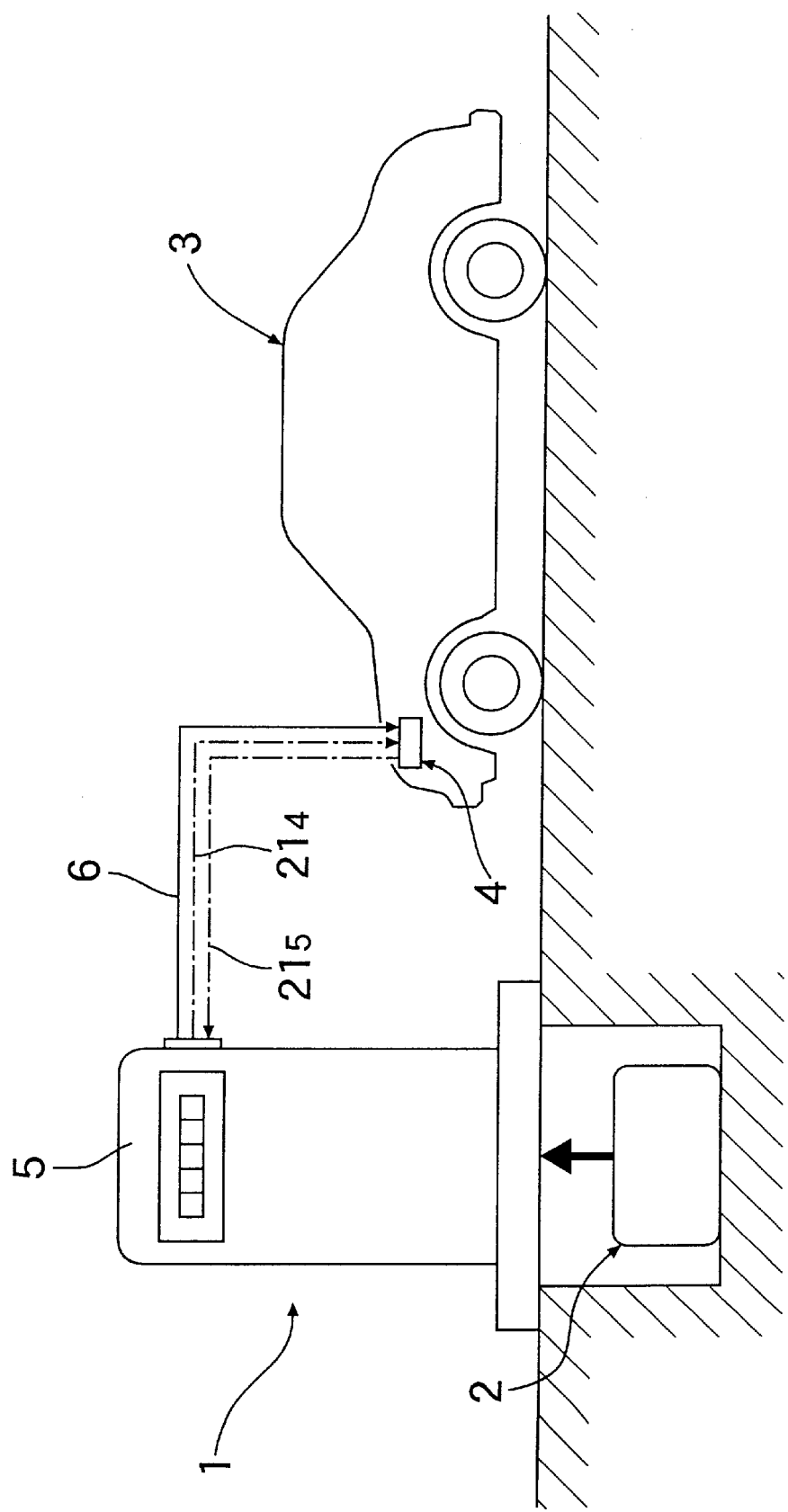
FIG. 1 is an illustration showing one example of hydrogen being filled in a hydrogen storage tank of an automobile in a hydrogen stand.

Referring to FIG. 1, a hydrogen station 1 includes a hydrogen supply tank 2 which has a metal hydride in which hydrogen has been absorbed. An automobile 3 includes a hydrogen storage tank 4 having a metal hydride, so that hydrogen released from the hydrogen supply tank 2 can be filled into the hydrogen storage tank 4 in the automobile 3 through a supply stand 5 and a main gas supply pipe 6 in the hydrogen station 1. In this embodiment, the hydrogen supply tank 2 in the hydrogen station 1 and the hydrogen storage tank 4 in the automobile 3 have the same structure. However, the volume of the hydrogen station 1 is larger than that of the hydrogen storage tank 4.

Figure 2:
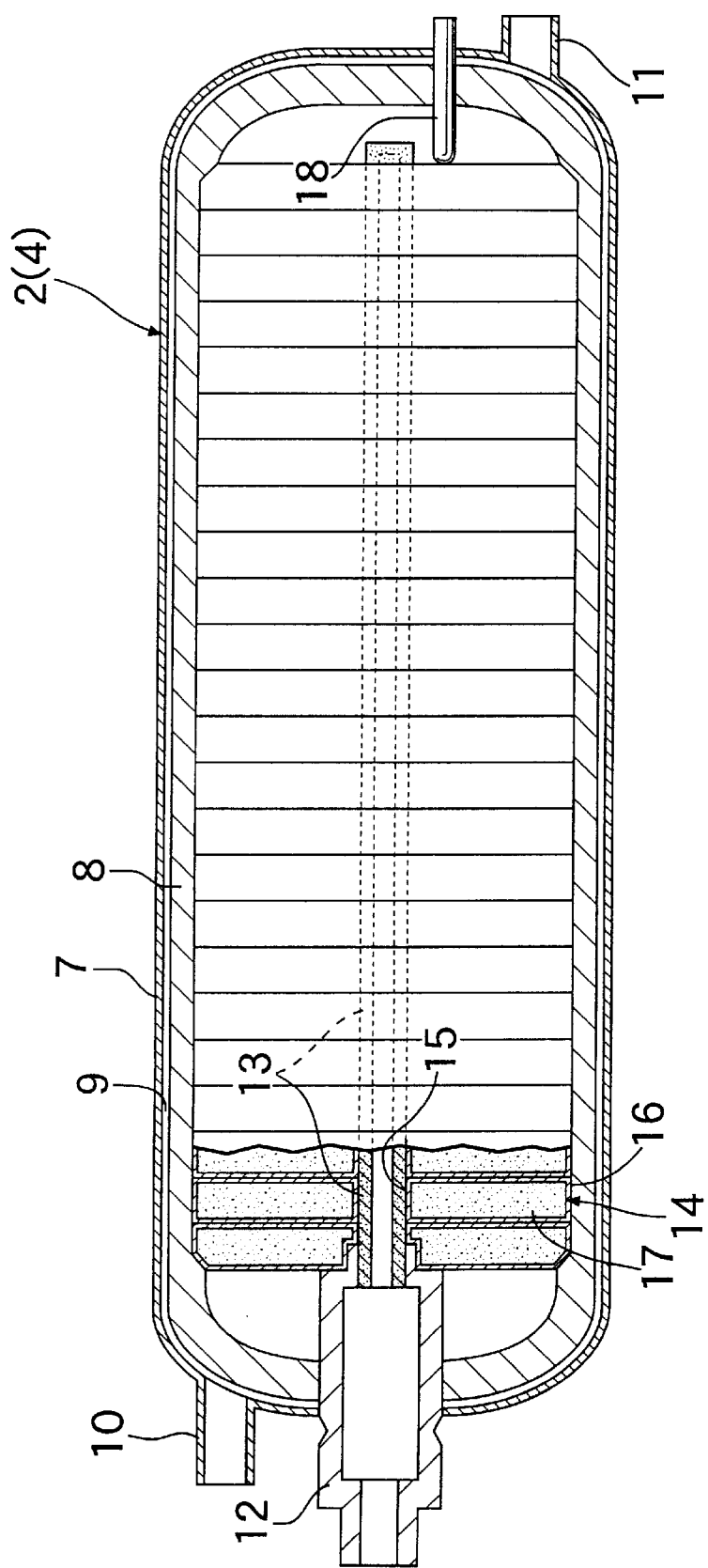
FIG. 2 is a vertical sectional view of hydrogen supply tank or hydrogen storage tank.

Referring to FIG. 2, the hydrogen supply tank 2 (and the hydrogen storage tank 4) includes an outer shell 7 made of a stainless steel, and an inner shell 8 made of a stainless steel and located within the outer shell 7. A space between the inner peripheral surface of the outer shell 7 and the outer peripheral surface of the inner shell 8 forms a passage 9 for pure water which functions as a heat transfer medium. The outer shell 7 has an inlet pipe 10 projectingly provided in one of end walls thereof, and an outlet pipe 11 projectingly provided in the other end wall. The interiors of pipes 10 and 11 communicate with the passage 9.

A hydrogen entrance and exit pipe 12 made of a stainless steel is air-tightly mounted in the end walls of the outer and inner shells 7 and 8 on the side of the inlet pipe 10 and extends through the end walls. A porous hydrogen access pipe 13 functioning as a metal filter made of, for example, sintered nickel is fitted at one open end thereof into an inner end of the hydrogen entrance and exit pipe 12, with the other closed end of the porous hydrogen access pipe 13 being located in the vicinity of the other end wall of the inner shell 8.

Figure 3:
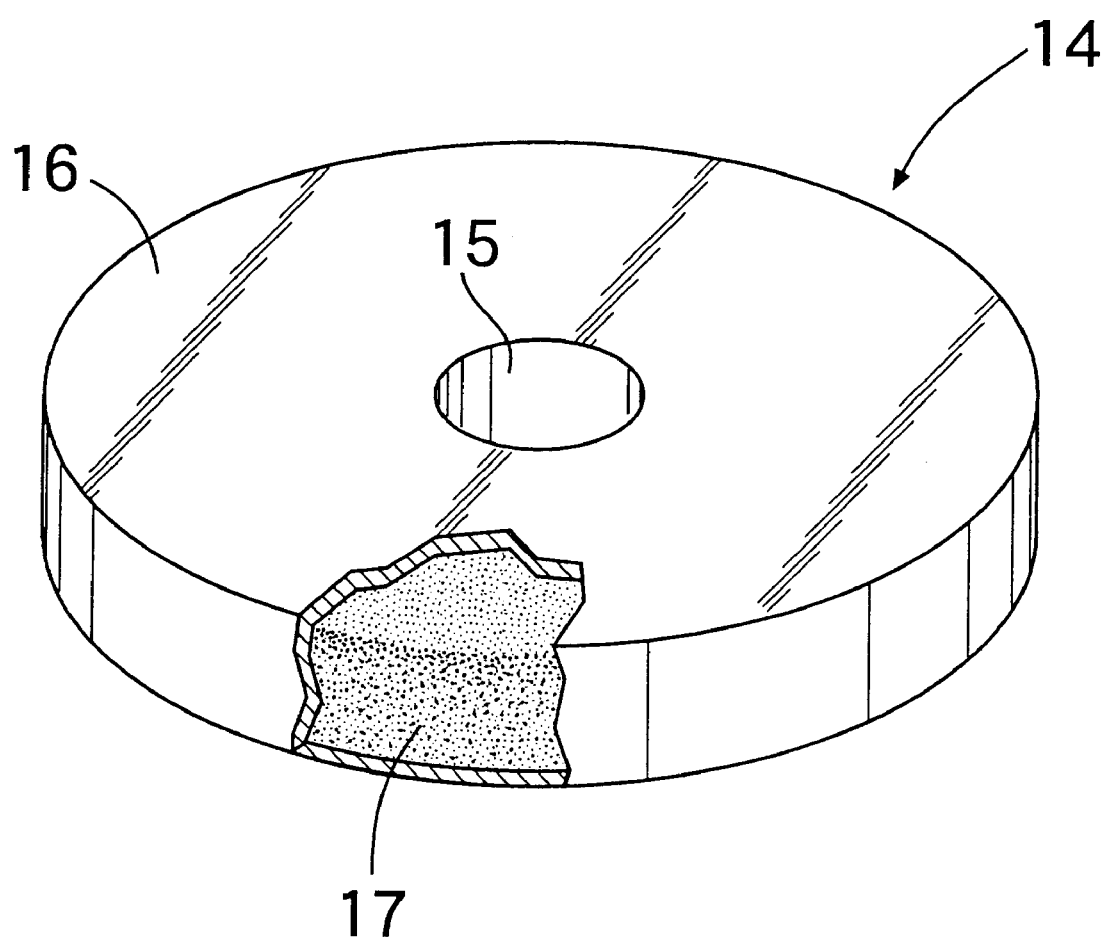
FIG. 3 is a broken perspective view of an essential portion of an alloy unit.

A plurality of disk-shaped alloy units 14 are carried on the hydrogen access pipe 13 which extends through their center bores 15, with adjacent alloy units 14 in close contact with each other, so that outer peripheral surfaces of the alloy units 14 are fitted to an inner peripheral surface of the inner shell 8. Each of the alloy units 14 comprises a thin, disk-shaped, closed container 16 made of aluminum with a powder of metal hydride 17 filled therein, as also shown in FIG. 3. $(TiZr)(MnV)_2$ is used as the metal hydride 17.

A thermocouple 18 is air-tightly mounted in the end walls of the outer and inner shells 7 and 8 on the side of the outlet pipe 11 and extends through the end walls.

Figure 4:
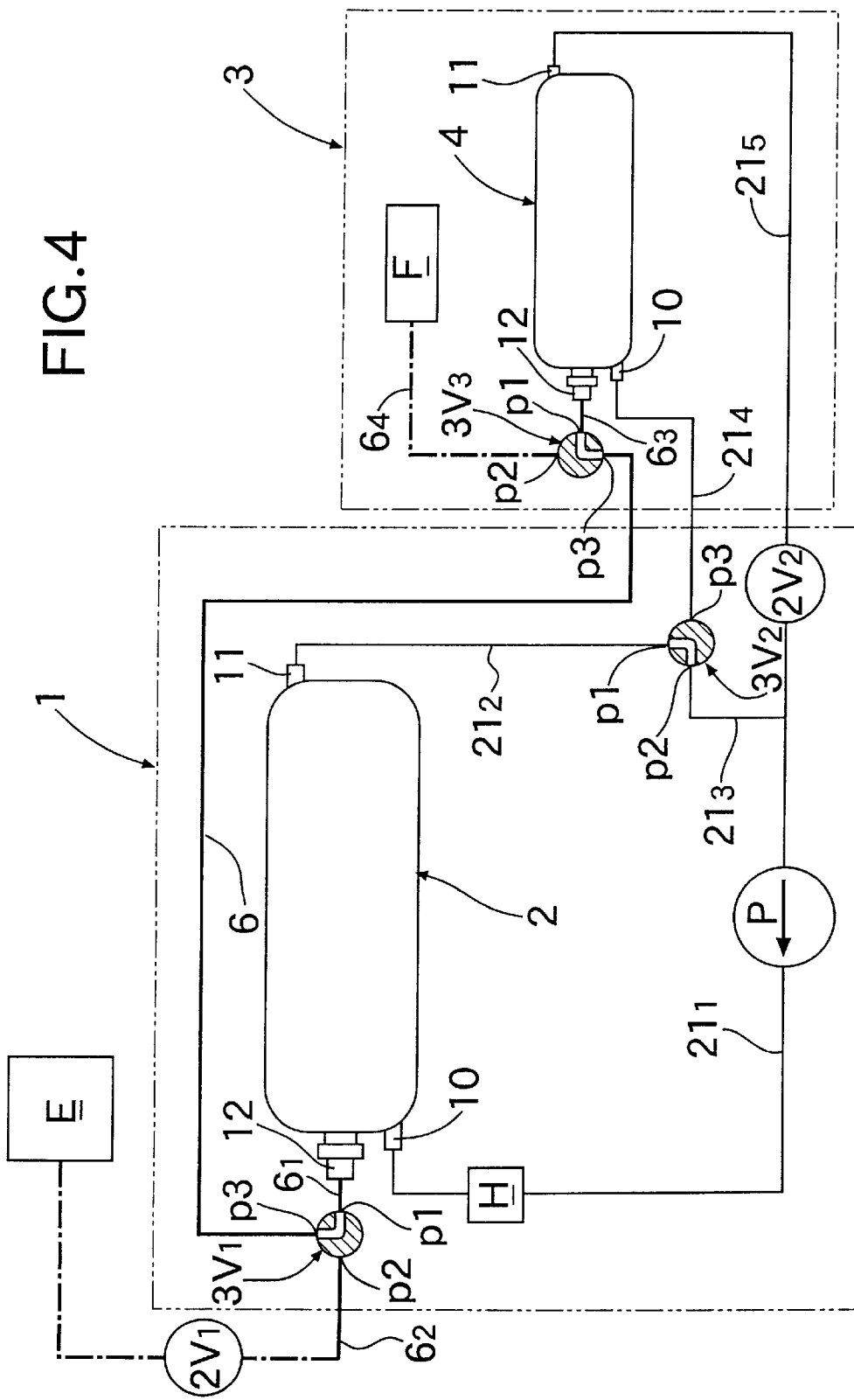
FIG. 4 is an illustration showing a hydrogen filling system.

FIG. 4 shows a hydrogen filling system. In the hydrogen station 1, a first port p1 of a first three-way valve $3V_1$ is connected to the hydrogen entrance and exit pipe 12 of the hydrogen supply tank 2 through a first gas supply pipe $6_1$, and a second port p2 of the first three-way valve $3V_1$ is connected to a water electrolytic device E which is a hydrogen generating source, through a second gas supply pipe $6_2$ having a first two-way valve $2V_1$. A first water conduit $21_1$ is connected to the inlet pipe 10 of the hydrogen supply tank 2 and has a heater H provided at a location near the inlet pipe 10, a second two-way valve $2V_2$ provided at the end connected to the automobile 3, and a circulating pump P provided between the second two-way valve $2V_2$ and the heater H. A first port p1 of a second three-way valve $3V_2$ is connected to the outlet pipe 11 of the hydrogen supply tank 2 through a second water conduit $21_2$, and a second port p2 of the second three-way valve $3V_2$ is connected to the first water conduit $21_1$ at a location between the circulating pump P and the second two-way valve $2V_2$ through a third water conduit $21_3$.

In the automobile 3, a first port p1 of a third three-way valve $3V_3$ is connected to the hydrogen entrance and exit pipe 12 of the hydrogen storage tank 4 through a third gas supply pipe $6_3$, and a second port p2 of the third three-way valve $3V_3$ is connected to a fuel cell F through a fourth gas supply pipe $6_4$.

In filling hydrogen into the hydrogen storage tank 4 of the automobile 3, the third port p3 of the third three-way valve $3V_3$ is first connected to the third port p3 of the first three-way valve $3V_1$ in the hydrogen station 1 through the main gas supply pipe 6. In addition, the inlet pipe 10 of the hydrogen storage tank 4 in the automobile 3 is connected to the third port p3 of the second three-way valve $3V_2$ in the hydrogen station 1 through a fourth water conduit $21_4$, and the outlet pipe 11 is connected to the second two-way valve $2V_2$ in the hydrogen station 1 through a fifth water conduit $21_5$. Then, the first and second two-way valves $2V_1$ and $2V_2$ are closed, and the first and third three-way valves $3V_1$ and $3V_3$ are switched over, so that their first and third ports p1 and p3 communicate with each other. Further, the second three-way valve $3V_2$ is switched over, so that its first and second ports p1 and p2 communicate with each other.

Thereafter, the circulating pump P and the heater H are operated. Then, pure water is circulated through a water passageway comprising the circulating pump P→the heater H→the passage 9 in the hydrogen supply tank 2→the second three-way valve $3V_2$→the circulating pump P. The temperature of the pure water is, for example, about 25° C. at the start of the filling, but is raised by the heating of the pure water by the heater H. Therefore, when the temperature of the pure water in the inlet pipe 10 of the hydrogen supply tank 2 has reached about 44.2° C. the output from the heater H and flow rate of the pure water circulated by the circulating pump P are controlled, so that such temperature is maintained.

In the hydrogen supply tank 2, the metal hydride 17, which has absorbed hydrogen therein within each of the alloy units 14, is heated by the pure water having a raised temperature. When the temperature of the metal hydride 17 reaches about 44.2° C. which is the same temperature as the pure water, the metal hydride 17 releases the hydrogen. The released hydrogen penetrates the container 16 made of aluminum and the porous wall of the hydrogen access pipe 13 to enter the inside of the hydrogen access pipe 13, and is then passed through the pipe 13, the hydrogen entrance and exit pipe 12, the first three-way valve $3V_1$, the main gas supply pipe 6, the third three-way valve $3V_3$ and the like into the hydrogen storage tank 4.

In the hydrogen storage tank 4, the hydrogen is passed through the hydrogen entrance and exit pipe 12 into the hydrogen access pipe 13; penetrates the porous wall of the latter and the container 16 made of aluminum of each of the alloy units 14, and thus, is absorbed in the metal hydride 17. As a result of such absorption of the hydrogen, the metal hydride 17 is heated.

In the hydrogen supply tank 2, on the other hand, the heat of the pure water is consumed for heating of the metal hydride 17 and hence, the temperature of the pure water reaching the inside of the outlet pipe 11 has been lowered to about 26.9° C. At this time point, the second three-way valve $3V_2$ is switched over, so that the first and third ports p1 and p3 communicate with each other; the second two-way valve $2V_2$ is opened, and the operation of the heater H is stopped. This causes the pure water of about 26.9° C. discharged from the outlet pipe 11, to flow through the passage 9 in the hydrogen storage tank 4, so that the metal hydride 17 is cooled. Thus, the pure water is raised in temperature up to about 44.2° C. by such cooling, and the pure water having the raised temperature is discharged from the outlet pipe 11 toward the hydrogen supply tank 2.

In the subsequent steady state, when the pure water is circulated between the hydrogen supply tank 2 and the hydrogen storage tank 4, the metal hydride 17 heated with the exothermic reaction of hydrogen absorption is cooled by the pure water in the hydrogen storage tank 4, and the pure water which is raised in temperature up to about 42.2° C. by the cooling of the metal hydride, is discharged toward the hydrogen supply tank 2. In the hydrogen supply tank 2, on the other hand, the metal hydride 17 is heated by the pure water to release the hydrogen, and the pure water which is lowered in temperature down to about 26.9° C. by such heating, is discharged toward the hydrogen storage tank 4.

When the flow rate of the pure water in the steady state is 10 L/min in a case where the weight of the metal hydride 17 in the hydrogen supply tank 2 is 90 kg and the amount of hydrogen stored is 0.90 kg, and the weight of the metal hydride 17 in the hydrogen storage tank 4 is 44 kg and the amount of hydrogen stored is 0.54 kg, the amount of hydrogen supplied from the hydrogen supply tank 2 to the hydrogen storage tank 4 is 6 $Nm^3$ (268 mol), and the filling time is about 10 minutes.

If the technique as described above is employed, the heater H may be used in the hydrogen station 1 to heat the metal hydride 17 to release the hydrogen, only at the stage of start of the filling. In the subsequent steady state, the quantity of heat provided by the exothermic reaction of metal hydride 17 in the hydrogen storage tank 4 can be utilized effectively to release the hydrogen in the hydrogen station 1. On the other hand, the pure water lowered in temperature by the heat exchange in the hydrogen supply tank 2 is used for the cooling of the metal hydride 17 in the hydrogen storage tank 4 and hence, any special cooling means for the pure water is not required.

Figure 5:
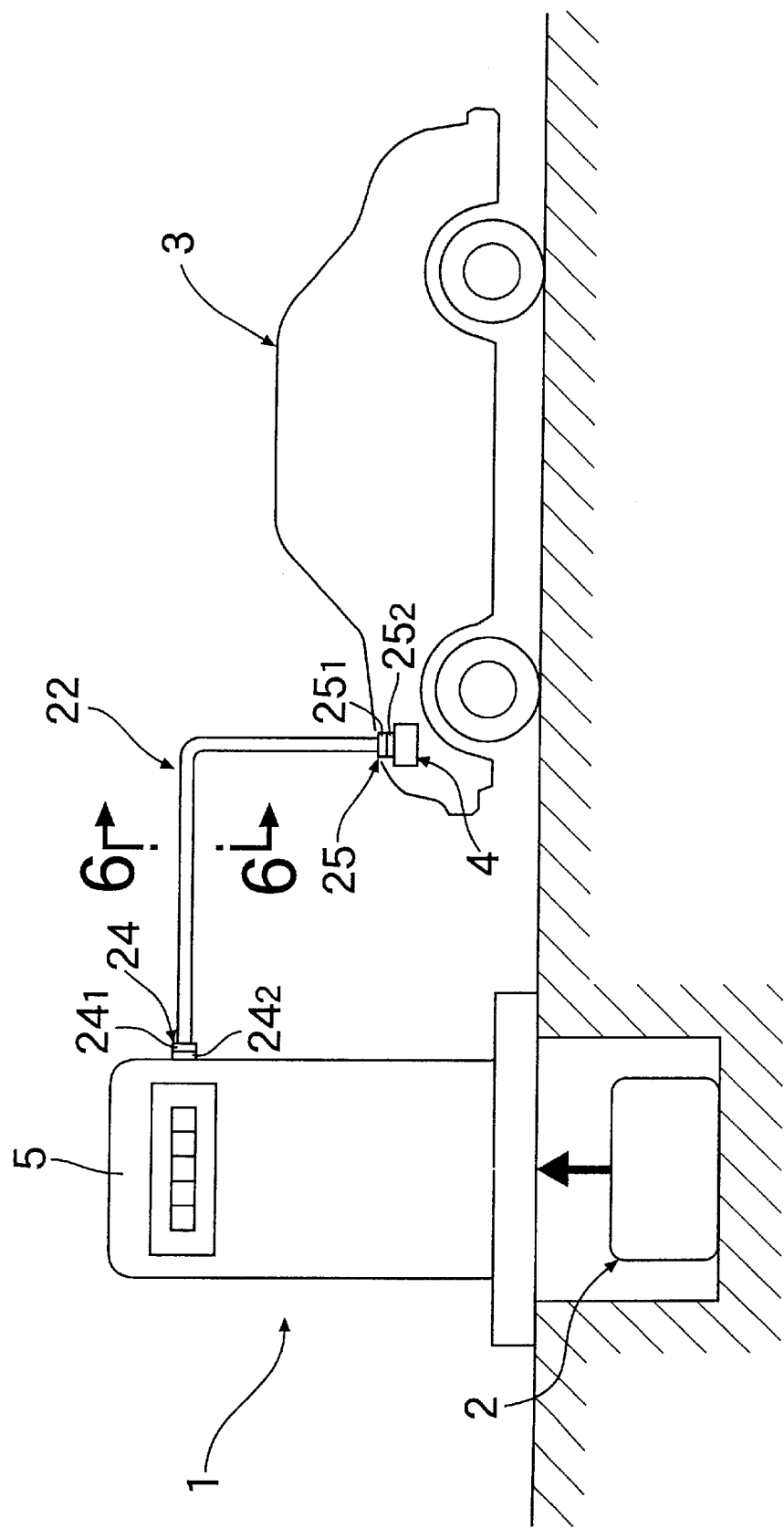
FIG. 5 is an illustration showing another example of hydrogen being filled in a hydrogen storage tank of an automobile in a hydrogen stand.
Figure 6:
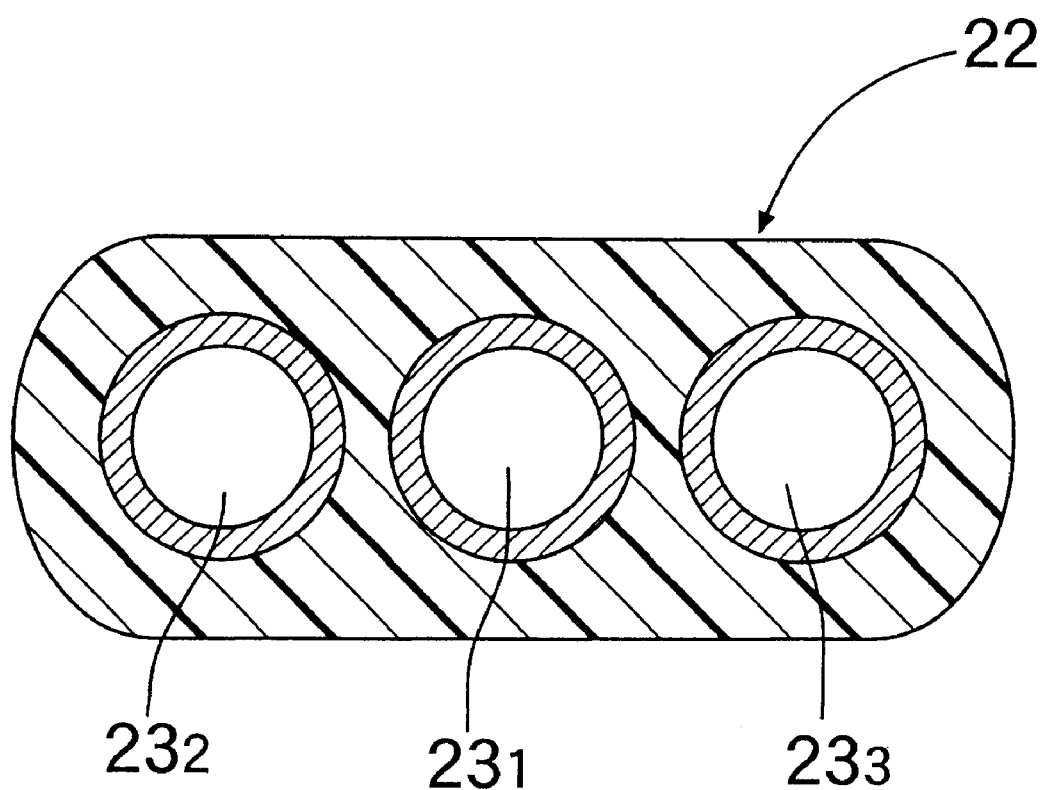
FIG. 6 is a sectional view taken along a line 6—6 in FIG. 5.

FIG. 5 shows the hydrogen supply tank 2 in the hydrogen station 1 with a supply stand 5 connected to the hydrogen supply tank 2 in the embodiment. The hydrogen storage tank 4 is in the automobile 3, wherein the supply stand 5 and the hydrogen storage tank 4 are connected to each other through a collecting passage member 22. The collecting passage member 22 includes a first passage $23_1$ through which hydrogen is passed, a second passage $23_2$ through which the pure water having a lowered temperature is passed, and a third passage $23_3$ through which the pure water having a raised temperature is passed, as clearly shown in FIG. 6. The collecting passage member 22 has halves $24_1$ and $25_1$ of connectors 24 and 25 at opposite ends thereof. The halves are detachably connected to halves $24_2$ and $25_2$ of the other connector existing in the supply stand 5 and the hydrogen storage tank 4, respectively.

Thus, as shown in FIGS. 7 and 4, a through-bore $26_1$ connected to the third port p3 in the first three-way valve $3V_1$, a through-bore $26_2$ connected to the third port p3 in the second three-way valve $3V_2$ and a through-bore $26_3$ connected to the second two-way valve $2V_2$, which exist in the other half $24_2$ in the supply stand 5, are connected to a through-bore $27_1$ connected to a third port p3 of the third three-way valve $3V_3$, a through-bore $27_2$ connected to the inlet pipe 10 and a through-bore $27_3$ connected to the outlet pipe 11, which exist in the other half $25_2$ in the hydrogen storage tank 4, respectively, through the first to third passages $23_1$ to $23_3$.

If such a collecting passage member 22 is used, it is easy to connect and disconnect the supply stand 5 and the hydrogen storage tank 4 to and from each other, and the connecting line system can be simplified.

According to the present invention, by employing the means as described above, the quantity of heat generated by the metal hydride in the hydrogen storage tank of the automobile can be utilized effectively in the hydrogen station for heating the metal hydride which is required for releasing of hydrogen, thereby achieving an energy saving.

Further, according to the present invention, it is possible to easily perform the connection and disconnection of the hydrogen supply tank in the hydrogen station and the hydrogen storage tank in the automobile, and to simplify the connecting line system.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A process for filling hydrogen into a hydrogen storage tank in an automobile, the hydrogen being supplied from a hydrogen station including a hydrogen supply tank having a metal hydride with hydrogen absorbed therein, to said hydrogen storage tank having a metal hydride, the process comprising the steps of:

(a) circulating a heat transfer medium from said hydrogen supply tank to said hydrogen storage tank, cooling said metal hydride in said hydrogen storage tank with said heat transfer medium, said metal hydride having been heated by prior absorption of hydrogen therein, the cooling of said metal hydride causing the absorption of hydrogen in said metal hydride, in said storage tank, (b) circulating said raised temperature heat transfer medium from said hydrogen storage tank to said hydrogen supply tank, heating said metal hydride in said hydrogen supply tank with said heat transfer medium, the heating of said metal hydride with said heat transfer medium causing the release of hydrogen from said metal hydride in said supply tank, and (c) recirculating the heat transfer medium from said hydrogen supply tank to said hydrogen storage tank, cooling said metal hydride in said hydrogen storage tank with said heat transfer medium, said metal hydride having been heated by prior absorption of hydrogen therein, the cooling of said metal hydride causing the absorption of hydrogen in said metal hydride, in said storage tank, and circulating said raised temperature heat transfer medium from said hydrogen storage tank to said hydrogen supply tank, heating said metal hydride in said hydrogen supply tank with said heat transfer medium, the heating of said metal hydride with said heat transfer medium causing the release of hydrogen from said metal hydride in said supply tank.

\* \* \* \* \*